(12) United States Patent
Sachs et al.

(10) Patent No.: US 10,455,340 B1
(45) Date of Patent: Oct. 22, 2019

(54) VALIDATING THE OPERATION OF A TRANSDUCER AND AN AUDIO SIGNAL PATH

(71) Applicant: MOTOROLA SOLUTIONS, INC., Chicago, IL (US)

(72) Inventors: Daniel Grobe Sachs, Elmhurst, IL (US); Charles B. Harmke, Huntley, IL (US); Ellis A. Pinder, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/977,150

(22) Filed: May 11, 2018

(51) Int. Cl.
*H04R 29/00* (2006.01)
*G08B 21/18* (2006.01)
*H04B 17/23* (2015.01)
*H04B 17/10* (2015.01)

(52) U.S. Cl.
CPC ......... *H04R 29/001* (2013.01); *G08B 21/185* (2013.01); *H04B 17/10* (2015.01); *H04B 17/23* (2015.01)

(58) Field of Classification Search
CPC .... H04R 29/001; G08B 21/185; H04B 17/10; H04B 17/23
USPC ..................................................... 381/58, 59
See application file for complete search history.

(56) References Cited

U.S. PATENT DOCUMENTS

| 7,082,205 | B1 | 7/2006 | Westermann |
| 7,492,909 | B2 | 2/2009 | Carter, Jr. |
| 9,124,965 | B2* | 9/2015 | Heiman ............... H04R 1/00 |
| 9,454,893 | B1 | 9/2016 | Warren et al. |
| 2006/0039568 | A1 | 2/2006 | Lee et al. |
| 2011/0051941 | A1* | 3/2011 | Gratke ............... H04R 29/004 381/58 |

\* cited by examiner

*Primary Examiner* — Xu Mei
*Assistant Examiner* — Ammar T Hamid
(74) *Attorney, Agent, or Firm* — Michael Best & Friedrich LLP

(57) ABSTRACT

Systems and methods for validating the operation of a transducer and an audio signal path to the transducer. An example method includes switching, with an audio switch, the audio signal path between an audio power amplifier and an analog-to-digital converter. The method includes routing an audio signal received from the transducer to the analog-to-digital converter when the audio power amplifier is not enabled. The method includes, upon receiving a button signal, processing, with an electronic processor, a digital version of the audio signal received from the analog-to-digital converter to generate a sample. The method includes comparing the sample to a reference audio sample. The method includes generating an alert when the sample does not match the reference audio sample.

20 Claims, 3 Drawing Sheets

_US 10,455,340 B1_

VALIDATING THE OPERATION OF A TRANSDUCER AND AN AUDIO SIGNAL PATH

BACKGROUND OF THE INVENTION

Public safety personnel (for example, police, fire fighters, first responders, investigators, and the like) use portable communication devices to communicate with one another during the performance of their duties. Effective communications enhances the ability of such personnel to safely respond to emergencies, and to complete other assigned duties. The use of communication devices in hazardous environments or under stressful conditions may damage or impair the performance of some electronic components of the devices, resulting in degraded or interrupted communications between public safety personnel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
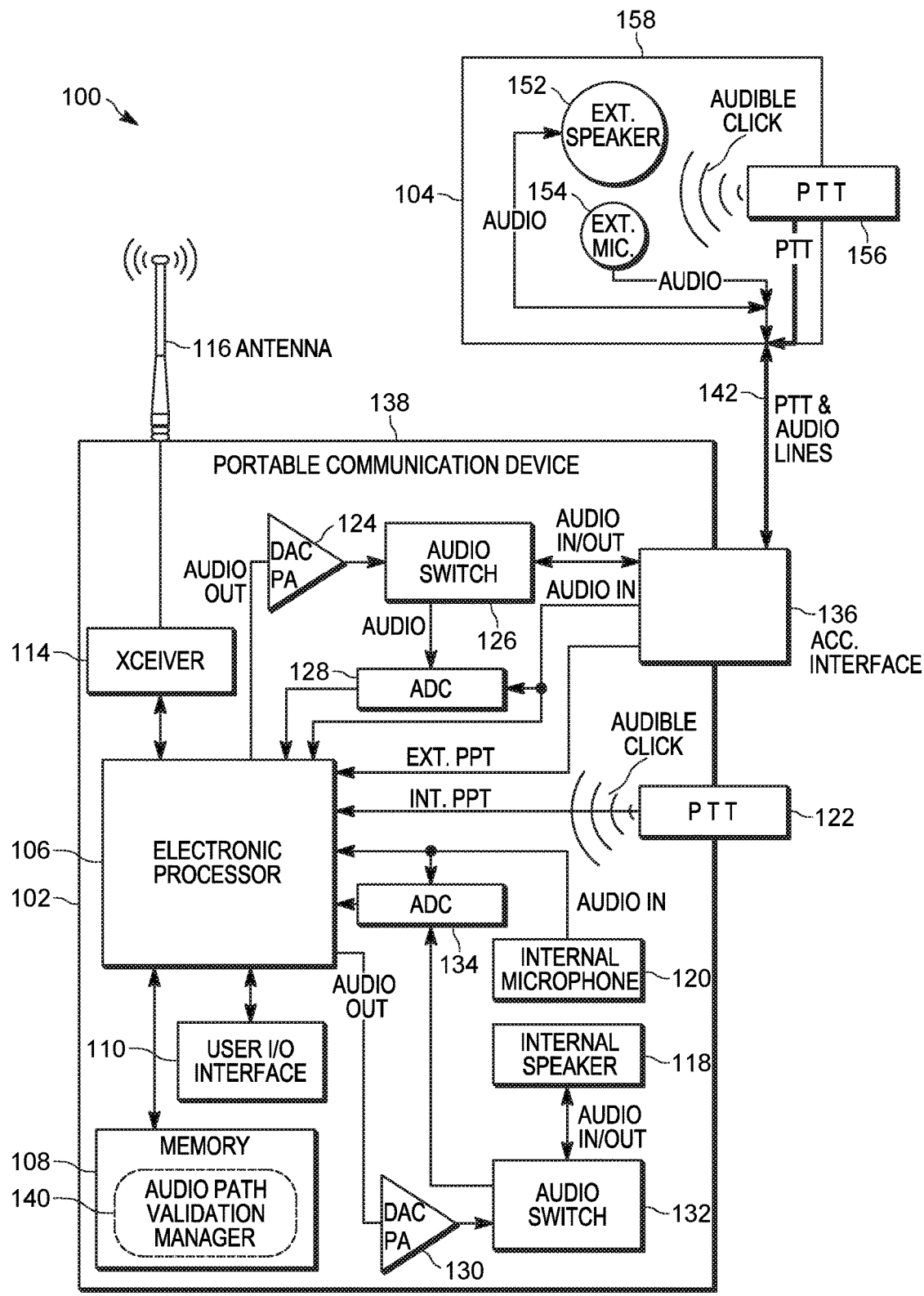
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, public safety personnel use portable communication devices to communicate. A portable communication device is subject to wear (for example, extreme heat during firefighting, and physical shock and contact during an outdoor foot chase), which may result in damage to some of the device's components. For example, a speaker coil of a firefighter's two-way radio may fail due to excessive temperature, reducing its ability to produce intelligible audio. A portable communication device is also subject to contaminants from the environment (for example, water, dirt, chemicals, and smoke), which may result in damage to or interference with the operation of some of the device's components. For example, over time, a microphone port may become jammed with detritus, reducing the microphone's ability to pick up speech and other acoustic signals for transmission.

To reduce or prevent impaired communications caused by damaged or otherwise compromised components, some devices employ electronic self-tests to check components and communication paths. However, such tests may not be able to detect physical damage in some components. For example, a shorted speaker coil, a damaged speaker cone, an internal microphone failure, and an acoustic port blocked with detritus are all physical problems that impair communications. However, none of the foregoing would trigger a failure when an electrical continuity test is performed. Some devices test audio components by generating test signals (for example, by generating sound on a speaker and detecting it on the microphone). However, such tests are not able to determine which of the speaker and microphone has failed. Furthermore, such tests cannot be performed during active communications to avoid interrupting the communications. Periodic audio test signals may also be annoying to the user and surrounding persons. Accordingly, embodiments presented herein provide, among other things, systems and methods validating the operation of a transducer and an audio signal path to the transducer.

Some embodiments presented herein receive and analyze audio signals created when buttons on a portable communication device are pressed and released. Vibrations produced by the pressing and releasing of the buttons are converted to audio signals by a transducer of the device, for example, a speaker or a microphone. The audio signals received during operation of the device can be compared to audio signals that the transducer is known to produce when it is operating properly. By making such comparisons, the device can validate the integrity of the transducer and the audio signal path to the transducer. Such embodiments enable portable communication devices to detect component failures that may otherwise go undetected using current electrical-self tests. Using such embodiments, a portable communication device can determine when an audio signal path is degraded, and re-route the audio to another audio signal path in order to preserve communications. For example, a two-way radio may determine that an accessory speaker is not operating properly, and re-route received audio to the speaker in the two-way radio. Furthermore, because such testing is not intrusive, it may be performed more frequently than tests relying on the generation of audio test signals. For example, a portable communication device may test the operation of its speaker upon each press and release of the push-to-talk switch and track the results over time. Using such embodiments, slowly degrading or intermittently failing components may be more quickly identified.

One example embodiment provides a system for validating the operation of a transducer and an audio signal path to the transducer. The system includes an audio power amplifier, an analog-to-digital converter, and an audio switch coupled in the audio signal path. The audio switch is configured to switch the audio signal path between the audio power amplifier and the analog-to-digital converter, and to route an audio signal received from the transducer to the analog-to-digital converter when the audio power amplifier is not enabled. The system also includes an electronic processor coupled to the analog-to-digital converter. The electronic processor is configured to, upon receiving a button signal, process a digital version of the audio signal received from the analog-to-digital converter to generate a sample. The electronic processor is configured to compare the sample to a reference audio sample. The electronic processor is configured to, when the sample does not match the reference audio sample, generate an alert.

Another example embodiment provides a method for validating the operation of a transducer and an audio signal path to the transducer. The method includes switching, with an audio switch, the audio signal path between an audio power amplifier and an analog-to-digital converter. The method includes routing an audio signal received from the transducer to the analog-to-digital converter when the audio power amplifier is not enabled. The method includes, upon receiving a button signal, processing, with an electronic processor, a digital version of the audio signal received from the analog-to-digital converter to generate a sample. The method includes comparing the sample to a reference audio sample. The method includes generating an alert when the sample does not match the reference audio sample.

Another example embodiment provides a remote speaker microphone. The remote speaker microphone includes an audio power amplifier, an analog-to-digital converter, and an audio switch coupled in the audio signal path. The audio switch is configured to switch the audio signal path between the audio power amplifier and the analog-to-digital converter, and to route an audio signal received from the transducer to the analog-to-digital converter when the audio power amplifier is not enabled. The system also includes an electronic processor coupled to the analog-to-digital converter. The electronic processor is configured to, upon receiving a button signal, process a digital version of the audio signal received from the analog-to-digital converter to generate a sample. The electronic processor is configured to compare the sample to a reference audio sample. The electronic processor is configured to, when the sample does not match the reference audio sample, generate an alert.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of an example communication system 100. The communication system 100 includes a portable communication device 102 and an accessory device 104. The portable communication device 102 transmits and receives audio, data, or combinations of both to other communication devices (not shown) using radio frequency signals. In some embodiments, the portable communication device 102 is a portable two-way radio (for example, one of the Motorola® APX™ series of radios). In some embodiments, the portable communication device 102 is a converged device including electronics, software, and other components sufficient to support both cellular and land mobile radio communications. In alternative embodiments, the portable communication device 102 may be any type of communication device including components and functionality as described herein.

The accessory device 104 is an electronic accessory to the portable communication device 102. In some embodiments, the accessory device 104 is a remote speaker microphone (an "RSM") (for example, a Motorola® APX™ XE Remote Speaker Microphone).

In the embodiment illustrated, the portable communication device 102 includes an electronic processor 106, a memory 108, an input/output interface 110, a transceiver 114, an antenna 116, an internal speaker 118, an internal microphone 120, a push-to-talk switch 122, a first audio power amplifier 124, a first audio switch 126, a first analog-to-digital converter 128, a second audio power amplifier 130, a second audio switch 132, a second analog-to-digital converter 134, and an accessory interface 136. The illustrated components, along with other various modules and components are coupled to each other by or through one or more electrical connections (for example, control or data buses) that enable communication therebetween. The use of such connections, including control and data buses, for the interconnection between and exchange of information among the various modules and components would be apparent to a person skilled in the art. The illustrated components, along with other various components are contained in or integrated with a housing 138. The housing 138 is a generally rigid structure. In some embodiments, the housing 138 is manufactured from plastic using injection molding. In other embodiments, the housing 138 is manufactured using other suitable materials or methods. In some embodiments, the portable communication device 102 includes fewer or additional components in configurations different from that illustrated in FIG. 1.

The electronic processor 106 obtains and provides information (for example, from the memory 108 and/or the input/output interface 110), and processes the information by executing one or more software instructions or modules, capable of being stored, for example, in a random access memory ("RAM") area of the memory 108 or a read only memory ("ROM") of the memory 108 or another non-transitory computer readable medium (not shown). The software can include firmware, one or more applications, program data, filters, rules, one or more program modules, and other executable instructions. The electronic processor 106 is configured to retrieve from the memory 108 and execute, among other things, software related to the control processes and methods described herein. The memory 108 can include one or more non-transitory computer-readable media, and includes a program storage area and a data storage area. The program storage area and the data storage area can include combinations of different types of memory, as described herein. In the embodiment illustrated, the memory 108 stores, among other things, an audio path validation manager 140, described more particularly below.

The input/output interface 110 receives input from, for example, a user input device of the portable communication device 102, provides system output, or a combination of both. Output may be provided via the internal speaker 118. The internal speaker 118 is a transducer for reproducing sound from electrical signals (for example, generated from a received audio stream) received from the electronic processor 106. In some embodiments, the input/output interface 110 includes a display (not shown), for example, a liquid crystal display (LCD) touch screen, or an organic light-emitting diode (OLED) touch screen. Alternative embodiments may include other output mechanisms such as, for example, haptic feedback motors and light sources (not shown). Input may be provided via, for example, a keypad, a microphone, soft keys, icons, or soft buttons on a display, a scroll ball, buttons, and the like. The input/output interface 110 may include a graphical user interface (GUI) (for example, generated by the electronic processor 106, from instructions and data stored in the memory 108, and presented on a display) that enables a user to interact with the portable communication device 102.

The electronic processor 106 is configured to control the transceiver 114 to transmit and receive audio (for example, voice) and other data to and from the portable communication device 102. The electronic processor 106 encodes and decodes digital data sent and received by the transceiver 114. The transceiver 114 transmits and receives radiofrequency signals from and to the portable communication device 102 using the antenna 116. The electronic processor 106 and the transceiver 114 may include various digital and analog components, which for brevity are not described herein and which may be implemented in hardware, software, or a combination of both. In some embodiments, the electronic processor 106 is coupled to or performs the functions of a digital signal processor, a baseband processor, or both (not shown). Some embodiments include separate transmitting and receiving components, for example, a transmitter and a receiver, instead of a combined transceiver 114.

The internal microphone 120 is a transducer capable of sensing sound, converting the sound to electrical signals, and transmitting the electrical signals to the electronic processor 106. The electronic processor 106 processes the electrical signals received from the internal microphone 120 to produce an audio signal, which may be transmitted to other devices via the transceiver 114.

The portable communication device 102 is capable of push-to-talk audio communication. Push-to-talk is a method of transmitting audio communications over a half-duplex communication channel. Push-to-talk communication may be between one individual and another individual or between one individual and a group of individuals (for example, via a talk group). A user of the portable communication device 102 controls push-to-talk communication using the push-to-talk switch 122.

The push-to-talk switch 122 is an electromechanical switch (for example, a normally-open momentary switch). The push-to-talk switch 122 includes a spring or other mechanical means of keeping the switch in an open position until pressed (for example, a metal snap dome), and returning it to an open position when it is released. Because users may operate the portable communication device 102 without looking at it, in noisy environments, in low-light conditions, or while wearing protective gloves, the push-to-talk switch 122 produces a tactile click when actuated. The push-to-talk switch 122 is mechanically coupled to the housing 138 (for example, mounted onto a PCB board that is attached to a section of the housing). Because the housing 138 is rigid, the tactile clicks produced by the pressing and releasing of the button produces vibrations in the housing 138, similar to a clapper ringing a bell. The push-to-talk switch 122, when pressed, causes transmission of an audio communication (for example, an audio signal produced by the internal microphone 120) from the portable communication device 102 via the electronic processor 106 and the transceiver 114. When the push-to-talk switch 122 is released, the transceiver 114 is placed into a reception mode, for example, to receive a response to the audio communication.

When the portable communication device 102 is receiving communications, the electronic processor 106 receives radiofrequency signals via the transceiver 114, and processes the signals to extract a digital received audio signal. The digital received audio signal is provided to the first audio power amplifier 124 and the second audio power amplifier 130. The first audio power amplifier 124 and the second audio power amplifier 130 decode the digital audio signals with integral codecs (digital-to-analog converters) and amplify the analog audio signal to a speaker level signal (for example, 6 volts). The amplified signal is received by the first audio switch 126 and the second audio switch 132. Each of the first audio switch 126 and the second audio switch 132 are electronic switches, controllable by the electronic processor 106 to switch between multiple audio inputs and outputs. When the portable communication device 102 is receiving communications, the first audio switch 126 is controlled to send the amplified audio signal to the accessory device 104 over an accessory interface cable 142, and the second audio switch 132 is controlled to send the amplified audio signal to the internal speaker 118. In some embodiments, the electronic processor 106 will only send the digital received audio signal to the second audio power amplifier 130 when the accessory device 104 is not connected to the portable communication device 102.

The first audio switch 126 operates to switch the accessory interface 136 between the first audio power amplifier 124 and the first analog-to-digital converter 128. The accessory interface 136 is an electrical connector for communicatively coupling the accessory device 104 to the portable communication device 102. The portable communication device 102 is coupled to the accessory device 104 via the accessory interface 136 and an accessory interface cable 142. The accessory interface cable 142 includes a plurality of wires for conveying audio and control signals to and from the accessory device 104. When the transceiver 114 is not receiving an audio transmission, the first audio power amplifier 124 is not enabled, and the first audio switch 126 couples the audio signal received via the accessory interface 136 to the first analog-to-digital converter 128. As described more particularly below, in some embodiments, the audio signal received is produced by an accessory speaker 152 of the accessory device 104. The first audio switch 126 includes an amplifier and other electronic circuitry for boosting the audio signal from the accessory speaker 152 to a level that can be processed by the first analog-to-digital converter 128. The first analog-to-digital converter 128 digitizes analog audio signals received from the first audio switch 126, and sends them to the electronic processor 106. The first analog-to-digital converter 128 includes multiple analog audio signal inputs, which are selectable by the electronic processor 106. For example, as illustrated in FIG. 1, the first analog-to-digital converter 128 receives analog audio input signals from the first audio switch 126 and the accessory interface 136.

When the transceiver 114 is receiving a transmission, the second audio switch 132 couples the amplified received audio signal from the second audio power amplifier 130 to the internal speaker 118. When the transceiver 114 is not receiving a transmission, the second audio power amplifier 130 is not enabled, and the second audio switch 132 couples an audio signal received from the internal speaker 118 to the second analog-to-digital converter 134. The second audio switch 132 includes an amplifier and other electronic circuitry for boosting the audio signal from the internal speaker 118 to a level that can be processed by the second analog-to-digital converter 134. The second analog-to-digital converter 134 digitizes analog audio signals received from the second audio switch 132, and sends them to the electronic processor 106. The second analog-to-digital converter 134 includes multiple analog audio signal inputs, which are selectable by the electronic processor 106. For example, as illustrated in FIG. 1, the second analog-to-digital converter 134 receives analog audio input signals from the second audio switch 132 and the internal microphone 120.

In the example illustrated, the accessory device 104 includes the accessory speaker 152, an accessory microphone 154, and an accessory push-to-talk switch 156. The accessory speaker 152, the accessory microphone 154, and the accessory push-to-talk switch 156 are housed or integrated into in an accessory housing 158. The accessory housing 158 is a rigid housing of similar construction to the portable communication device housing 138. The accessory speaker 152, the accessory microphone 154, and the accessory push-to-talk switch 156 are similar and operate similarly to their respective components in the portable communication device 102, namely the internal speaker 118, the internal microphone 120, and the push-to-talk switch 122. The accessory speaker 152 and the accessory microphone 154 exchange audio signals with the portable communication device 102 via the accessory interface cable 142. The accessory push-to-talk switch 156 sends a push-to-talk signal to the electronic processor 106 via the accessory interface cable 142.

In some embodiments, the accessory device 104 includes similar components as the portable communication device 102, for example, electronic processors, audio power amplifiers, audio switches, and analog-to-digital converters. In such embodiments, the accessory device 104 may connect to the portable communication device 102 wirelessly (for example, via Bluetooth™).

As noted above, actuating or de-actuating the push-to-talk switch 122 "rings" the housing 138, setting up vibrations in the housing 138 and the components contained therein. Similarly, actuating or de-actuating the accessory push-to-talk switch 156 "rings" the accessory housing 158, setting up vibrations in the accessory housing 158 and the components contained therein. A speaker (for example, the internal speaker 118 and the accessory speaker 152) is a transducer that produces sound in response to receiving an electrical signal. Conversely, when sound (or other vibration) encounters a speaker, the speaker produces an electrical signal in response. As a consequence, vibrations caused by the actuation or de-actuation of the push-to-talk switch 122 produce electrical currents (audio signals) in the internal speaker 118 and vibrations caused by the actuation or de-actuation of the accessory push-to-talk switch 156 produce electrical currents (audio signals) in the accessory speaker 152. As described herein, these electrical currents may be used to test the speakers and other components of the system 100.

Figure 2:
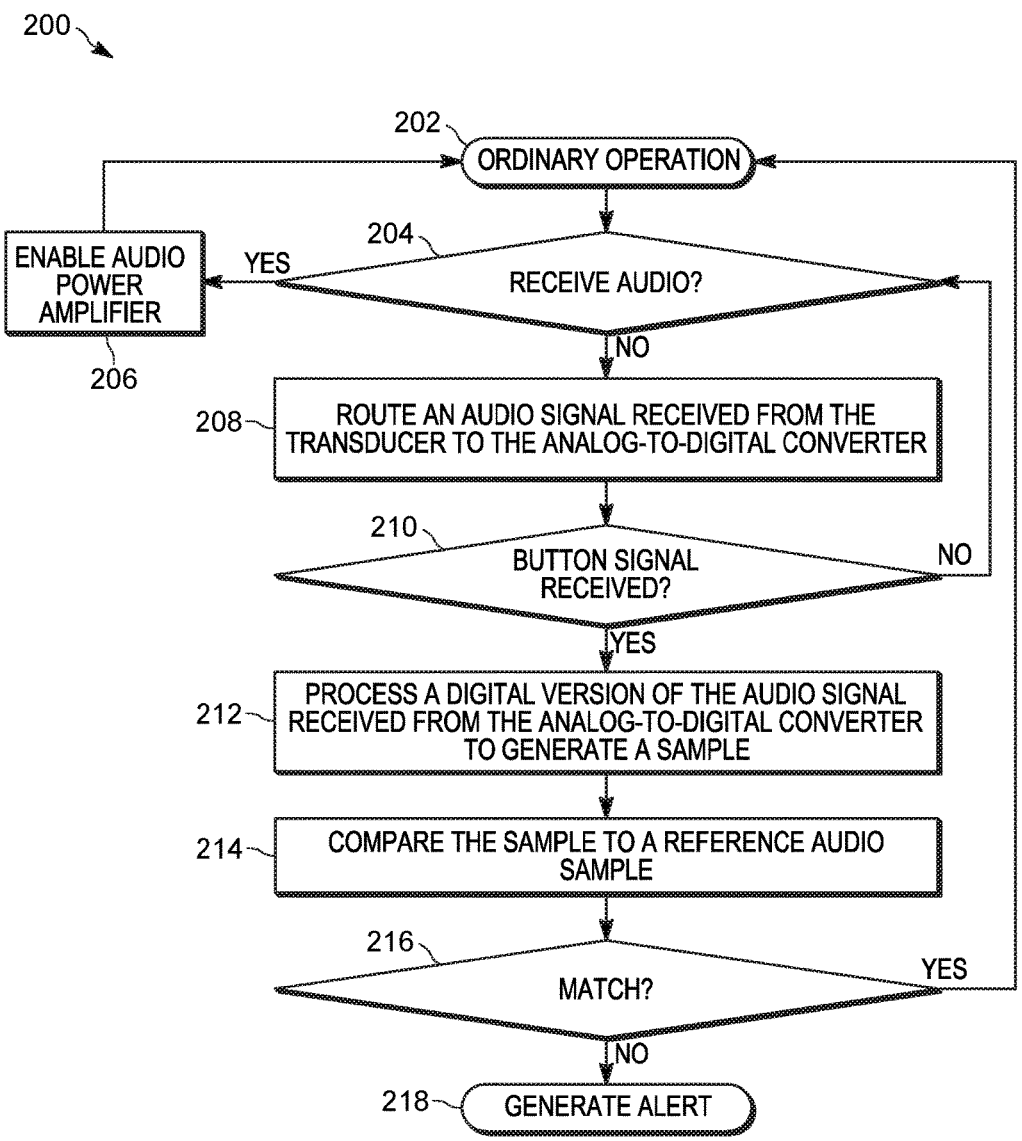
FIG. 2 is a flowchart illustrating a method for validating the operation of a transducer of the communication system of FIG. 1 and an audio signal path to the transducer, in accordance with some embodiments.

FIG. 2 illustrates an example method 200 for validating the operation of a transducer of the communication system 100 and an audio signal path to the transducer. The method 200 is described as being performed by the portable communication device 102 and, in particular, the first audio switch 126 and the electronic processor 106. However, it should be understood that in some embodiments, portions of the method 200 may be performed external to the portable communication device 102 by other devices, including for example, the accessory device 104. As an example, the method 200 is described in terms of validating the operation of the accessory speaker 152 and the audio signal path (including, for example, the accessory interface cable 142) to the accessory speaker 152 using vibrations generated by the accessory push-to-talk switch 156. However, the methods described herein are applicable to validating the operation of the internal speaker 118 using the second audio switch 132, the second audio power amplifier 130, and the electronic processor 106. The method 200 may also be performed by an embodiment of the accessory device 104 that includes the appropriate components (for example, an electronic processor, and audio switch, and an analog-to-digital converter).

At block 202, the method 200 begins with the portable communication device 102 in ordinary operation. For example, the transceiver 114 is tuned to a particular channel for communication with other devices and listening for radio communications. When a radio signal is received and a received audio signal is produced (at block 204), the first audio switch 126 connects the first audio power amplifier 124 to the accessory interface 136, and the audio is presented as sound via the accessory speaker 152 (at block 206).

When no radio signal is received, and thus the audio power amplifier is not enabled (at block 204), the first audio switch 126 routes an audio signal received from the accessory speaker 152 to the first analog-to-digital converter 128 (at block 208). In this example, the audio signal is produced by the accessory speaker 152 acting as a microphone (that is, producing electrical signals in response to received vibrations).

As buttons, knobs, or other controls of the portable communication device 102 and the accessory device 104 are actuated, the electronic processor receives button signals from the controls. A button signal is an electrical signal that a button has been actuated or de-actuated. Button signals may be received on buses internal to the portable communication device 102, or via the accessory interface cable 142 and the accessory interface 136. In this example, the button signal is a push-to-talk release signal.

While no button signal (push-to-talk release signal) is received (at block 210), the system 100 continues monitoring for receive audio, and routing audio signals using the audio switch (at blocks 204 through 208).

When a push-to-talk release signal is received (at block 210), the electronic processor 106 processes a digital version of the audio signal received from the first analog-to-digital converter 128 to generate a sample (at block 212). In this example, the audio signal is generated by vibrations caused by the physical release of the accessory push-to-talk switch 156.

At block 214, the electronic processor 106 compares the sample to a reference audio sample. In this example, the reference audio sample represents the sound generated by a correctly-working accessory speaker 152 when the accessory push-to-talk switch 156 is released. In some embodiments, the electronic processor 106 compares the sample and the reference audio sample using a matched filter.

Figure 3A:
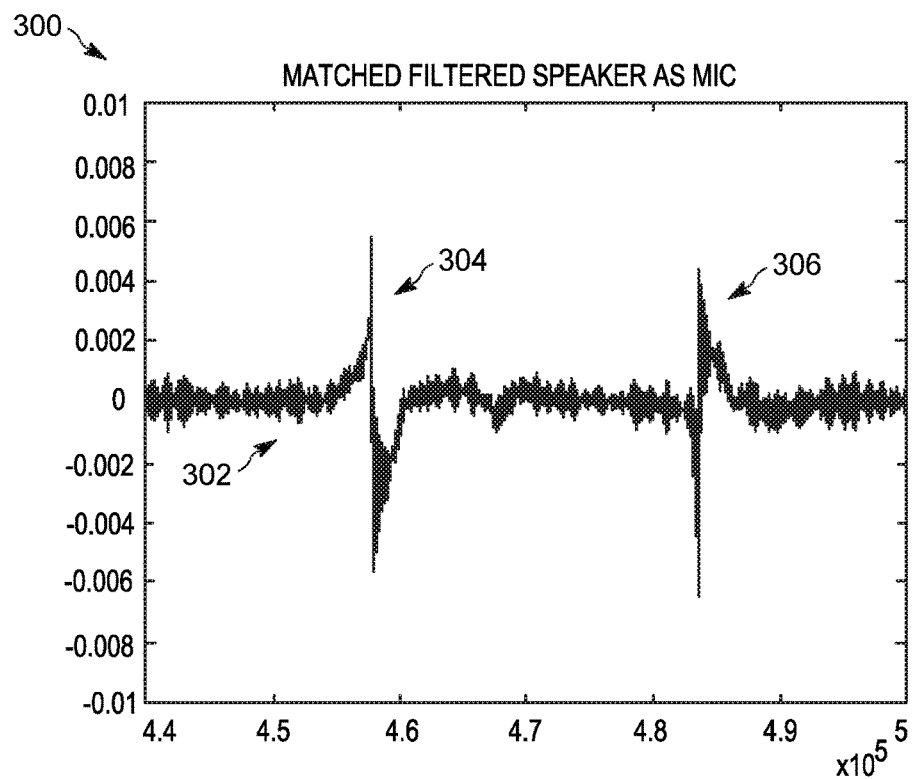
FIGS. 3A and 3B are charts illustrating audio signals received from a transducer and audio signal path of the communication system of FIG. 1, in accordance with some embodiments.
Figure 3B:
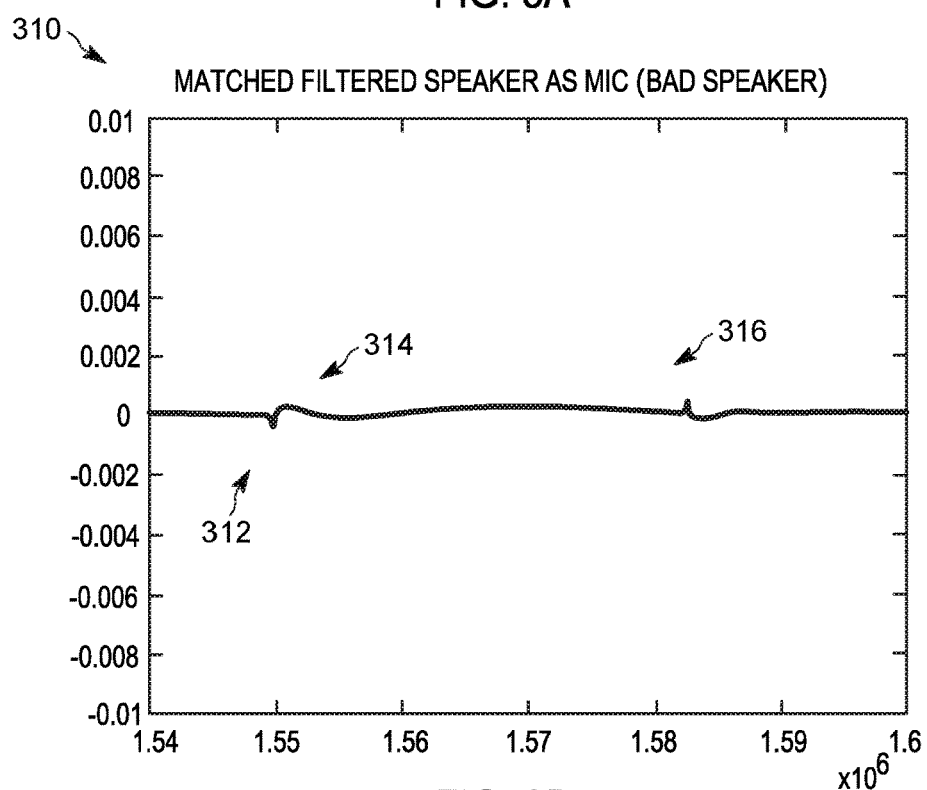

When the samples match (at block 216), the electronic processor 106 determines that the accessory speaker 152 and the audio signal path are operating within specifications, and the communication system 100 continues ordinary operation (at block 202). For example, FIG. 3A includes a chart 300 illustrating a matched filter to a reference audio sample 302 for a push-to-talk switch being pressed (304) and released (306) when the speaker is operating as expected.

Returning to FIG. 2, when the samples do not match (at block 216), the electronic processor 106 generates an alert (at block 218). For example, FIG. 3A includes a chart 310 illustrating a matched filter to a reference audio sample 312 for a push-to-talk switch being pressed (314) and released (316) when the speaker is not operating as expected (but yet is electrically continuous).

The electronic processor 106 generates the alert to notify the user of the communication system 100 that there is a problem with either the accessory speaker 152 or the audio signal path (for example, the accessory interface cable 142). In some embodiments, the alert is an audio alert, a visual alert, a haptic alert, a network message (for example, sent to a communication system controller), or combinations of the foregoing. In some embodiments, in place of or in addition to generating the alert, the electronic processor 106 re-routes audio signals to an alternate audio signal path. For example, the electronic processor 106 may divert received audio signals from the accessory interface to the internal speaker 118, so that the user of the system 100 is still able to receive audio communications from others.

The method 200 is described above in terms of vibrations caused by the actuation or de-actuation of a push-to-talk switch. It should be noted that the methods described herein are also applicable to vibrations produced by buttons or knobs other than push-to-talk switches. Other physical controls (for example, knobs, buttons, switches, and the like) that produce sufficient vibrations in the housing and an accompanying reference signal may be used.

The method 200 is described above in terms of validating the operation of a speaker and the audio signal path to the speaker. It should be noted that similar methods are applicable to validating the operation of the internal microphone 120, the accessory microphone 154, and audio signal paths to those components. In such embodiments, the electronic processor 106 does not operate the audio switches to route audio from the speakers. Instead, the electronic processor 106 processes and compares audio produced by the microphones in response to vibrations, for example, as caused by the actuation or de-actuation of a push-to-talk switch.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system to validate the operation of a transducer and an audio signal path to the transducer, the system comprising:
   an audio power amplifier;
   an analog-to-digital converter;
   an audio switch coupled in the audio signal path, the audio switch configured to
      switch the audio signal path between the audio power amplifier and the analog-to-digital converter, and
      route an audio signal received from the transducer to the analog-to-digital converter when the audio power amplifier is not enabled; and
   an electronic processor, coupled to the analog-to-digital converter, and configured to
      upon receiving an electrical signal indicating that a button has been either actuated or de-actuated, process a digital version of the audio signal received from the analog-to-digital converter to generate a sample, compare the sample to a reference audio sample that represents sound generated when the button is either actuated or de-actuated; and when the sample does not match the reference audio sample, generate an alert.

2. The system of claim 1, wherein the electronic processor is further configured to, in response to generating the alert, re-route audio signals for the transducer to an alternate audio signal path.

3. The system of claim 1, wherein
the button signal is a push-to-talk release signal; and
the reference audio sample represents sound generated when a push-to-talk switch is released.

4. The system of claim 1, wherein the transducer is a speaker.

5. The system of claim 1, wherein the alert is at least one selected from the group consisting of an audio alert, a visual alert, a haptic alert, and a network message.

6. The system of claim 1, further comprising:
an accessory interface coupled in the audio signal path;
wherein the audio switch is configured to switch the audio signal path by switching the accessory interface between the audio power amplifier and the analog-to-digital converter; and
wherein the electronic processor is coupled to the accessory interface and configured to receive the button signal via the accessory interface.

7. The system of claim 6, wherein the transducer is in an accessory device coupled to the accessory interface.

8. The system of claim 7, wherein the reference audio sample represents sound generated when a push-to-talk switch is released in the accessory device.

9. A method to validate the operation of a transducer and an audio signal path to the transducer, the method comprising:
switching, with an audio switch, the audio signal path between an audio power amplifier and an analog-to-digital converter, and
routing an audio signal received from the transducer to the analog-to-digital converter when the audio power amplifier is not enabled;
upon receiving an electrical signal indicating that a button has been either actuated or de-actuated, processing, with an electronic processor, a digital version of the audio signal received from the analog-to-digital converter to generate a sample,
comparing the sample to a reference audio sample that represents sound generated when the button is either actuated or de-actuated; and
generating an alert when the sample does not match the reference audio sample.

10. The method of claim 9, further comprising:
in response to generating the alert, re-routing audio signals for the transducer to an alternate audio signal path.

11. The method of claim 9, wherein
receiving a button signal includes receiving a push-to-talk release signal; and comparing the sample to a reference audio sample includes comparing the sample to a reference audio sample that represents sound generated when a push-to-talk switch is released.

12. The method of claim 9, wherein routing an audio signal received from the transducer includes routing an audio signal received from a speaker.

13. The method of claim 9, wherein generating an alert includes generating at least one selected from the group consisting of an audio alert, a visual alert, a haptic alert, and a network message.

14. The method of claim 9,
wherein switching the audio signal path includes switching an accessory interface between the audio amplifier and the analog-to-digital converter; and
wherein receiving a button signal includes receiving a push-to-talk release signal via the accessory interface.

15. The method of claim 14, wherein routing an audio signal received from the transducer includes routing an audio signal received from a transducer in an accessory device coupled to the accessory interface.

16. The method of claim 15, wherein comparing the sample to a reference audio sample includes comparing the sample to a reference audio sample that represents sound generated when a push-to-talk switch is released in the accessory device.

17. A remote speaker microphone comprising:
an audio signal path coupled to a transducer;
an audio power amplifier;
an analog-to-digital converter;
an audio switch coupled in the audio signal path, the audio switch configured to
switch the audio signal path between the audio power amplifier and the analog-to-digital converter, and
route an audio signal received from the transducer to the analog-to-digital converter when the audio power amplifier is not enabled; and
an electronic processor, coupled to the analog-to-digital converter, and configured to
upon receiving an electrical signal indicating that a button has been either actuated or de-actuated, process a digital version of the audio signal received from the analog-to-digital converter to generate a sample,
compare the sample to a reference audio sample that represents sound generated when the button is either actuated or de-actuated; and
when the sample does not match the reference audio sample, generate an alert.

18. The remote speaker microphone of claim 17, wherein the electronic processor is further configured to, in response to generating the alert, re-route audio signals for the transducer to an alternate audio signal path.

19. The remote speaker microphone of claim 17, wherein
the button signal is a push-to-talk release signal; and
the reference audio sample represents sound generated when a push-to-talk switch is released.

20. The remote speaker microphone of claim 17, wherein the transducer is a speaker.

* * * * *